(12) United States Patent
Watanabe

(10) Patent No.: US 6,347,186 B2
(45) Date of Patent: *Feb. 12, 2002

(54) DISK PLAYBACK DEVICE FOR PERFORMING SPECIAL PLAYBACK MODE ESTABLISHED BY SINGLE SPECIAL PLAYBACK KEY, AND MEDIA STORING PLAYBACK CONTROL PROGRAM FOR SAME

(75) Inventor: Kenichi Watanabe, Osaka (JP)

(73) Assignee: Funai Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,357

(22) Filed: Jun. 9, 1998

(30) Foreign Application Priority Data

Jun. 12, 1997 (JP) ............................................. 9-154961

(51) Int. Cl.$^7$ .............................................. H04N 5/781
(52) U.S. Cl. ....................................... 386/106; 386/125
(58) Field of Search ............................... 386/46, 95, 96, 386/104, 105, 106, 125, 68, 126, 75, 84; H04N 5/928, 5/781

(56) References Cited

U.S. PATENT DOCUMENTS 5,430,553 A * 7/1995 Misono et al. .............. 386/106
5,970,205 A * 10/1999 Nakamura et al. ............ 386/68
6,018,613 A * 1/2000 Ota et al. .................... 386/105

FOREIGN PATENT DOCUMENTS

| JP | 4-32084 A | 2/1992 |
| JP | 7-282523 A | 10/1995 |
| JP | 8-18922 A | 1/1996 |
| JP | 8-161819 A | 6/1996 |

* cited by examiner

Primary Examiner—Huy Nguyen
(74) Attorney, Agent, or Firm—Lackenbach Siegel Marzullo Aronson & Greenspan, P.C.

(57) ABSTRACT

A disc playback device reproduces either a video disc or an audio disc which is loaded and includes a digest playback device for reproducing each track of the video disc for a predetermined time and a scan playback device for reproducing each track on the audio disc for a predetermined time. A special playback instructing device instructs the disc playback device to reproduce each track of the disc which is loaded, for a predetermined time, and a disc type judging device is used for judging the type of disc to be reproduced. A special playback control device operates such that when the special playback instructing device issues an instruction to play back, if the result of judgment by the disc type judging device shows a video disc, the special playback control device drives the digest playback device, and if the result of judgment by the disc type judging device shows an audio disc, the special playback control device drives the scan playback device.

8 Claims, 4 Drawing Sheets

DISK PLAYBACK DEVICE FOR PERFORMING SPECIAL PLAYBACK MODE ESTABLISHED BY SINGLE SPECIAL PLAYBACK KEY, AND MEDIA STORING PLAYBACK CONTROL PROGRAM FOR SAME

BACKGROUND OF INVENTION

The present invention relates to a disc playback device and a media storing a playback control program for the disc playback device. More particularly, the invention relates to a disc playback device which is capable of playing back a video disc and an audio disc in a manner that each track of each disc is reproduced for a predetermined time, and a media for storing a playback control program for the disc playback device.

There is known a disc playback device as shown in FIG. 6.

In FIG. 6, a disc playback device 1 accepts a video compact disc (CD) (referred to simply as a disc) and/or an audio disc for its playback or reproduction. The disc playback device 1 reads out data from the disc loaded by an optical pick-up under control of a system controller 3. When the data is read out of the video disc, the data is separated into video data and audio data. The video data is decoded by an MPEG video decoder 4a. The decoded video data is image processed in a predetermined manner by a display processor 4b. The processed image data is converted into a corresponding analog signal by a video D/A converter 4c. The analog signal is converted into a composite video signal by a video encoder 4d. The audio data separated from the readout data is decoded by an MPEG audio decoder 5a. The decoded signal is converted into an analog signal by an audio D/A converter 5b. The analog signal is then amplified by an amplifier 5c. The data that is read out of the audio disc is not MPEG data. Therefore, the data of the audio disc is input to the audio D/A converter 5b through the MPEG audio decoder 5a, while not processed by the audio decoder 5a. And it is converted into an analog signal by the audio D/A converter 5b.

A specific key on the operation panel 6 is operated to enter a playback instruction to the disc playback device. In response to the playback instruction, the system controller 3 executes a process specified by the instruction. The operation panel 6 includes a digest playback key and a scan playback key, both not shown, as well as the select switch 6a. When the digest playback key is operated, the disc playback device 1 reproduces each track on the video disc for a predetermined time. When the scan playback key is operated, the device plays back each track on the audio disc for a predetermined time. Before operating the digest playback key or the scan playback key, the video disc or the audio disc is selected in accordance with the type of the reproduced disc by operating the select switch 6a. The system controller 3 executes a process of the digest playback or the scan playback only when the disc type selected is coincident with the disc type designated by the digest playback key or the scan playback key.

The conventional disc playback device described above has the following disadvantage.

To set up a special playback, i.e., the digest playback or the scan playback, the user must take two steps: a first step is to operate the select switch 6a to designate the type of disc to be reproduced, and a second step is to operate the digest playback key or the scan playback key to designate the playback mode. Those key operations are complicated and troublesome for the user.

SUMMARY OF INVENTION

Accordingly, an object of the present invention is to provide a disc playback device which can designate a special playback, i.e., a digest playback or a scan playback, through a simple operation.

Another object of the present invention is to provide a media for storing a playback control program for controlling the disc playback device.

To achieve the above object, there is provided a disc playback device to reproduce either a video disc or an audio disc which is loaded, comprising: digest playback means for reproducing each track of the video disc for a predetermined time; scan playback means for reproducing each track on the audio disc for a predetermined time; special playback instructing means for instructing the disc playback device to reproduce each track of the disc which is loaded, for a predetermined time; disc type judging means for judging the type of disc to be reproduced; and special playback control means operating such that when the special playback instructing means issues an instruction to play back, if the result of judgement by the disc type judging means shows a video disc, the special playback control means drives the digest playback means, and if the result of judgement by the disc type judging means shows an audio disc, the special playback control means drives the scan playback means.

The digest playback means is able to reproduce each track of the video disc for a predetermined time. The scan playback means is able to reproduce each track of the audio disc for a predetermined time.

The term "track" means a logical set of data. In the case of a video disc or an audio disc for KARAOKE, a set of data representative of a piece of music corresponds to a track. The digest playback produces an image attendant with a sound, while the scan playback produces only a sound. However, it may be considered that both the playback modes are substantially the same in their playback purposes. In other words, the playback purposes of those playback modes are to retrieve a desired track through the operation of reproducing each track for a predetermined time.

The digest playback means may be constructed such that each track is reproduced for a predetermined time in successive manner. In the present invention, the digest playback means outputs the reproduced image of each track to its related segmental image area on the divided display screen, and displays a still picture of the reproduced image on the segmental image area after the reproduction of each track.

Thus, the reproduced image of each track is output to its related segmental image area on the divided display screen, and a still picture is displayed on the segmental image area after the reproduction of each track. Therefore, with progression of the reproducing operation, the still pictures of the reproduced images of the tracks are additively displayed. If the track numbers are attached to the reproduced tracks, the user can know the track number of a desired track after the completion of the digest playback.

The scan playback means may constructed such that the tracks are successively reproduced from the first track of those serially arrayed tracks. Another function may additionally be used. For instance, the scan playback means causes display means to display the track number of the track under reproduction. The track number may be displayed in terms of numerals or in a suitable graphic manner.

To a special playback, e.g., a digest playback and a scan playback, the user instructs the disc playback device to execute the special playback by use of the special playback instructing means. The disc type judging means judges the type of disc to be reproduced, a video disc or an audio disc. If the judged disc is the video disc, the special playback control means drives the digest playback means, and if it is the audio disc, the special playback control means drives the scan playback means.

Where the technical idea of the present invention is realized by a software technique, it is evident that a recording media containing a software describing the technical idea is within the spirit and scope of the invention.

In this respect, the present invention provides a media storing a playback control program for a disc playback device which is capable of reproducing a video disc for a predetermined time in a digest playback mode and an audio disc for a predetermined time in a scan playback mode, the playback control program controlling the disc playback device such that when an instruction to play back each track for a predetermined time is issued, the playback control program causes the disc playback device to judge the type of disc to be reproduced, if the result of judgement shows a video disc, the playback control program causes the disc playback device to operate in a digest playback mode, and if the result of judgement shows an audio disc, the special playback control program causes the disc playback device to operate in a scan playback mode.

The recording media may take any form of media, e.g., a magnetic recording media, a magneto-optical recording media or any other recording media to be developed in the future. Further, any other copies, e.g., primary copies and secondary copies, are also contained in the recording media, as matter of course. The products obtained transmitted through communication networks are within the scope of the invention. What are stored into semiconductor chips fall with the present invention.

The invention may be realized in part by hardware and in part by software, and in a manner that a part of the technical idea of the invention is stored in a storage, and it is read out as it is used.

Operation to select the digest playback or the scan playback is simplified and easy.

It is easy to retrieve a desired track from the video disc.

It is easy to retrieve a desired track from the audio disc.

A playback control program is suitable for the disc playback device whose operation is improved to be easy in selecting the digest playback or the scan playback.

DETAILED DESCRIPTION OF PREFERRED EMBODIMENTS

The preferred embodiments of the present invention will be described with reference to the accompanying drawings.

Figure 1:
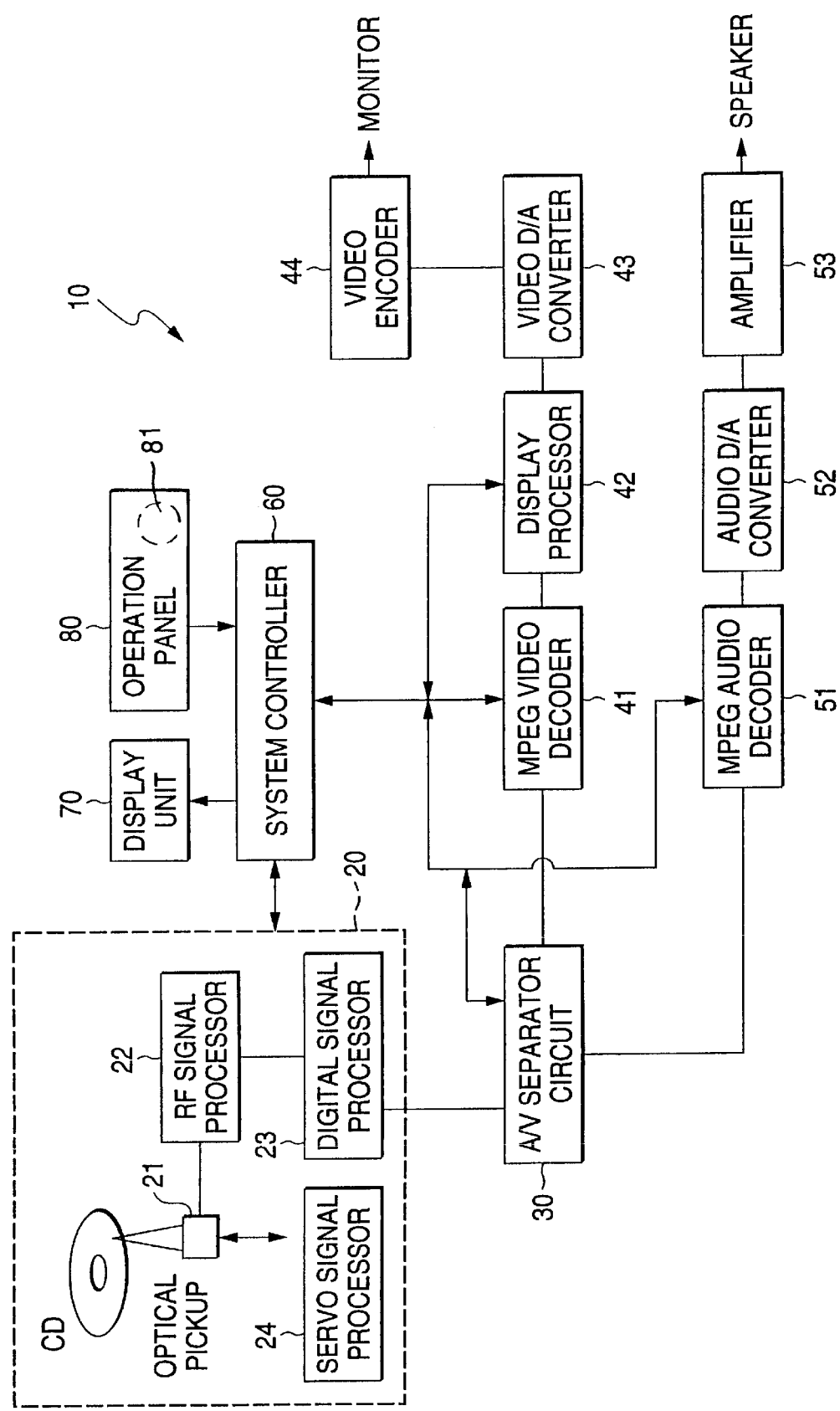
FIG. 1 is a block diagram showing a specific hardware construction of a disc playback device according to an embodiment of the present invention.

FIG. 1 is a block diagram showing a specific hardware of a disc playback device, which is an embodiment of the present invention.

As shown in FIG. 1, a disc playback device 10 includes a disc drive unit 20. The disc drive unit 20 is made up of an optical pickup 21, RF signal processor 22, digital signal processor 23, and servo signal processor 24.

The RF signal processor 22 receives an electrical signal from the optical pickup 21, and forms an RF signal, a focus tracking signal and a tracking servo error signal in accordance with the electrical signal thus received. The RF signal processor 22 wave-shapes the RF signal, and outputs an EFM signal to the digital signal processor 23. The digital signal processor 23 includes a PLL circuit, an EFM demodulator circuit and the like, which are not shown. The PLL circuit generates a bit clock signal used in demodulating the EFM signal. The digital signal processor 23 serially outputs a serial data stream. The digital signal processor 23 further includes a spindle servo control circuit, not shown. The servo control circuit controls the disc rotation so as to provide a fixed linear velocity of the disc.

A focus tracking signal and a tracking servo error signal are output from the RF signal processor 22, and input to the servo signal processor 24. The servo signal processor 24, which contains various types of servo circuits, performs a servo control in accordance with the focus tracking signal, to thereby maintain a fixed distance between the lens of the optical pickup 21 and the disc signal surface, and another servo control in accordance with the tracking servo error signal to follow up track pits. Further, the servo signal processor 24 performs a feed servo control to move the optical pickup 21 to the inner and outer circumferences of the disc.

The disc playback device 10 is capable of playing back or reproducing the video disc and the audio disc. The reproducing operations of the video disc and the audio disc are similar to each other in that the digital signal processor 23 produces a serial data stream, but are different from each other in the data format and the subsequent data processings carried out in the stages succeeding to the digital signal processor 23. The process of reproducing the video disc will first be described.

The data stream, which is output from the digital signal processor 23 during the operation of reproducing the video disc, comprises video data and audio data, which are arranged in an interleaving fashion. Therefore, the A/V separator circuit 30 separates the data stream into video data and audio data. The video data and the audio data are then input to the MPEG video decoder 41 and the MPEG audio decoder 51, respectively.

The MPEG video decoder 41 and the MPEG audio decoder 51 decode the video data and the audio data, arranges the video data and the audio data on the same time axis so as to synchronously reproduce the video data and the audio data, and outputs the resultant data. The MPEG video decoder 41 includes a RAM (not shown). The RAM is used as a buffer for temporarily storing input data or a memory for storing the image data already decoded for the operation compensation purpose.

The decoded video data that is output from the MPEG video decoder 41 is input to the display processor 42. The display processor 42 processes the video data for a divided display screen to be described later, and outputs R, G and B color digital signals each being of 8 bits, to the video D/A converter 43. The horizontal and vertical sync signals, which are used for generating video signals, are also generated by the display processor 42. The video D/A converter 43 converts the digital signals into R, G and B analog signals and outputs the resultant to the video encoder 44. The video encoder 44 forms a composite video signal by using the R, G and B analog signals and the horizontal and vertical sync signals, and sends the composite video signal to a monitor (not shown). The decoded audio signal is output from the MPEG audio decoder 51 to the audio D/A converter 52. The audio D/A converter 52 converts the audio signal into an analog audio signal and outputs the audio signal to the amplifier 53. The amplifier 53 amplifies the audio signal and applies it to a speaker (not shown).

During the process of reproducing the audio disc, the data stream that is output from the disc drive unit 20 is not the MPEG data. Therefore, it is input to the audio D/A converter 52 by way of the A/V separator circuit 30 and the MPEG audio decoder 51; the audio D/A converter 52 converts it into an analog audio signal and outputs the analog audio signal to the amplifier 53; and the amplifier 53 amplifies the analog audio signal and outputs the amplified one to the speaker.

Various operation controls of the hardware and the controls for the digest playback and the scan playback, which will subsequently be described, are carried out by the system controller 60. In this sense, digest playback means is constructed with the disc drive unit 20, A/V separator circuit 30, MPEG video decoder 41, display processor 42, video D/A converter 43, MPEG audio decoder 51, audio D/A converter 52, amplifier 53, and system controller 60. Scan playback means is constructed with the disc drive unit 20, audio D/A converter 52 and system controller 60.

Further, the system controller 60, which controls the hardware, controls the operation of the display unit 70, and detects instructions coming from the operation panel 80. The display unit 70 displays a given count and the track number of the track under reproduction. With the display by the display unit, the user can visually know the track number of the track under reproduction from the display by the display unit 70.

The operation panel 80 includes various operation keys, e.g., a playback key. The system controller 60 carries out a process designated by an instruction, which is entered from the operation panel 80. The operation panel 80 further includes a special playback key 81. When the 81 is operated, an instruction is entered into the disc playback device. In the device, the system controller 60 detects the instruction, and carries out a special playback process described by a special playback control program, which is flow charted in FIG. 2.

Figure 2:
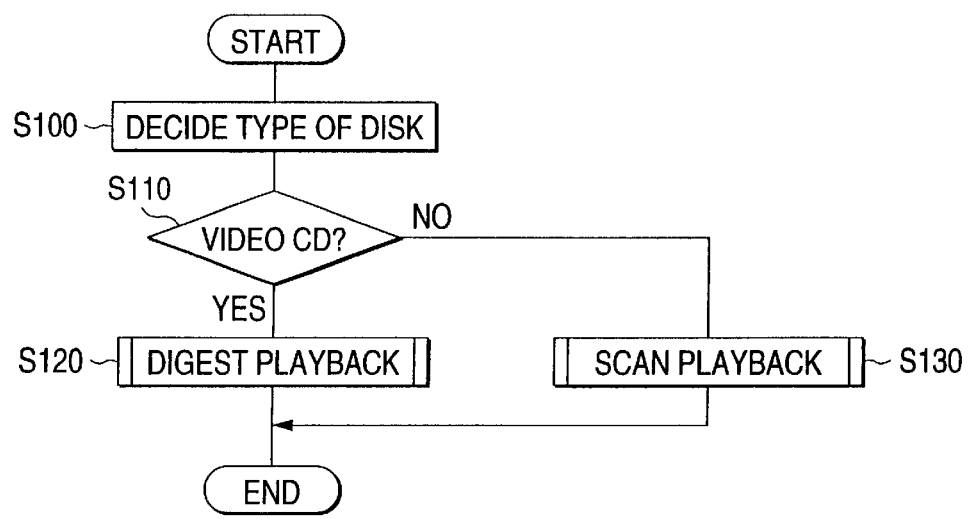
FIG. 2 is a flow chart showing a special playback control program.

A special playback control flow by the program will be described with reference to FIG. 2.

The system controller 60 decides the type of disc that is loaded into the disc drive unit 20 (step S100). The disc playback device in this embodiment is capable of playing back or reproducing the video disc and/or the audio disc. Therefore, the disc playback device must recognize the type of disc currently loaded in the disc drive unit 20. Namely, the disc playback device reads a TOC (table of contents) on the disc to recognize the type of the disc to be reproduced. More specifically, when the video disc or the audio disc is loaded to the disc drive unit 20, the system controller 60 detects the setting of the disc, reads the TOC of the disc to be reproduced, and stores the TOC information into a predetermined storage area. In the step S100, the system controller 60 refers to the stored TOC information and decides the type of the loaded disc, on the basis of the TOC information.

The controller judges whether or not the loaded disc is the video disc (step S110). If the answer is YES, the controller advances to a step S120, and executes a digest playback process. If the answer is NO, the controller advances to a step S130, and executes a scan playback process.

Figure 3:
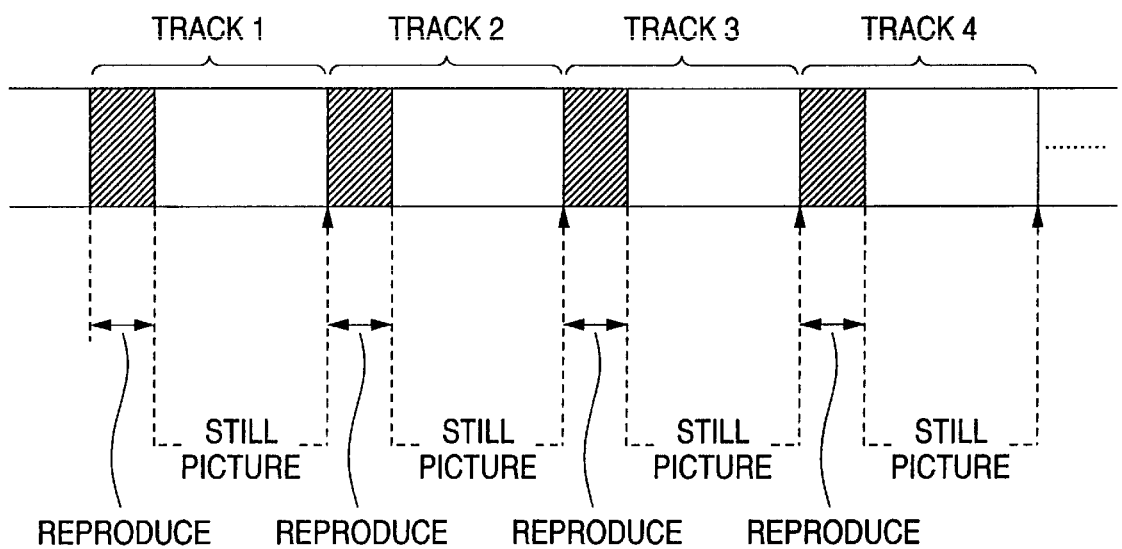
FIG. 3 is a diagram useful in explaining a digest playback process.
Figure 4:
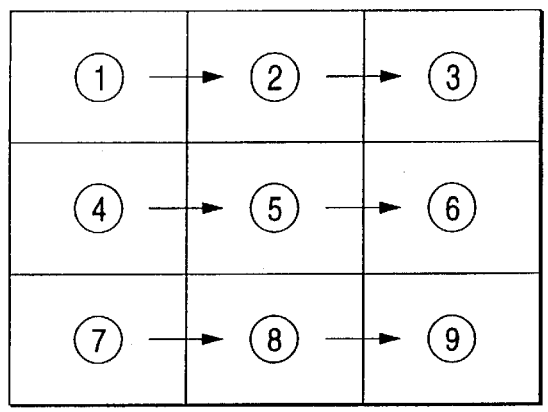
FIG. 4 is a front view showing a divided display screen used for the digest playback.

As shown in FIG. 3, in the disc playback device, the tracks on the disc are sequentially reproduced from the first track to the subsequent ones in such a way that each track is reproduced for a predetermined time. When the reproducing operation of the first track (track 1) starts, the controller instructs the display processor 42 to output the reproduced image of the first track to its related display area in a divided display screen. To be more specific, a front view of the divided display screen is shown in FIG. 4. As shown, the divided display screen consists of nine segmental image areas (1) to (9) arrayed in a matrix of 3×3. The reproduced image of the first track is input to the segmental image area (1), and the operation of reproducing the first track is stopped after the reproducing operation continues for a predetermined time. At this time, the controller instructs the display processor 42 to retain the present still picture in the segmental image area (1), and to continue the outputting of the R, G and B image signals.

After the reproducing operation for the first track is stopped, the system controller 60 acquires the start address of the next track (track 2) from the TOC of the video disc under reproduction, and starts the operation of reproducing the next track. At this time, the controller instructs the display processor 42 such that the display process outputs the reproduced image of the next or second track to the segmental image area (2) while retaining the still picture of the first track in the segmental image area (1). When the operation of reproducing the second track has continued for a predetermined time, the display processor 42, under control of the controller 60, stops the reproducing operation and retains a still picture of the second track in the segmental image area (2). Subsequently, the sequential operations including the steps of 1) retaining a reproduced still picture of the present track in its related segmental image area, 2) acquiring the start address of the next track, and 3) reproducing the next track, are repeated while changing the segmental image areas one to another in the direction of arrows in FIG. 4. With those operations, after the digest playback mode ends, the user can know the track number of a desired track from the still picture present on the display screen.

Figure 5:
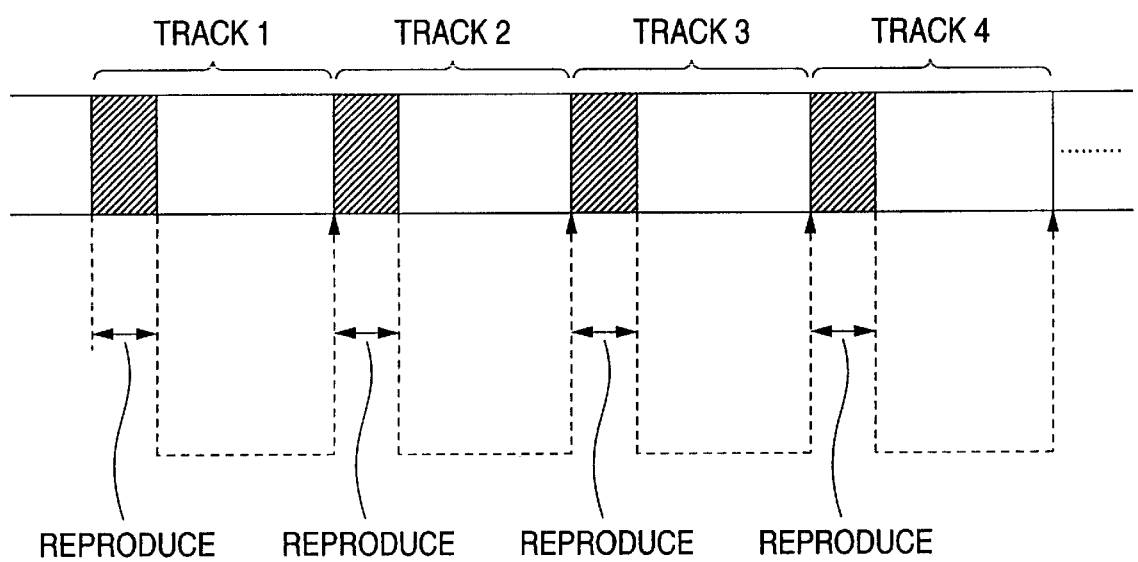
FIG. 5 is a diagram useful in explaining a scan playback process.
Figure 6:
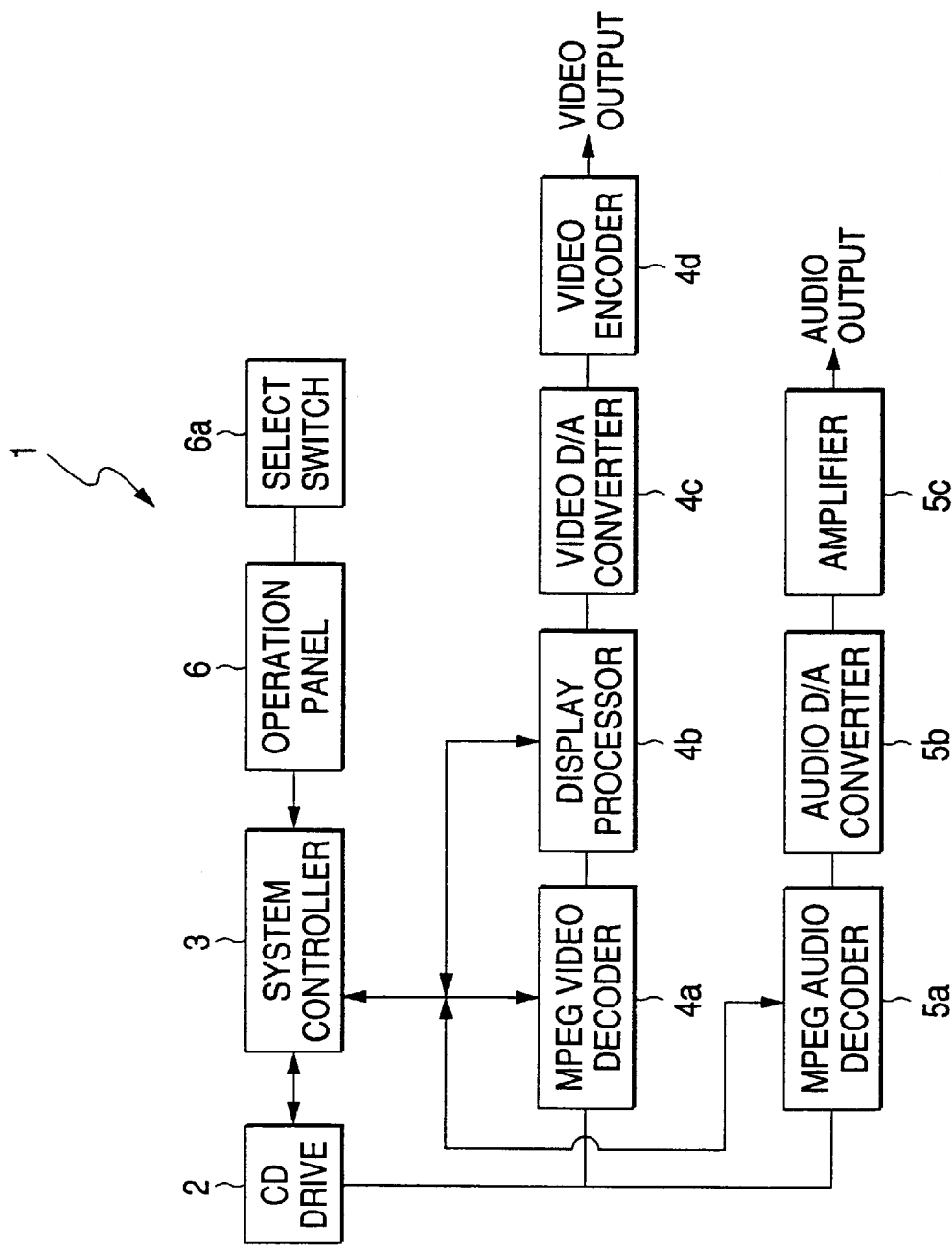
FIG. 6 is a block diagram showing a hardware construction of a conventional disc playback device.

When the disc playback device is in a scan playback mode and the disc to be reproduced is the audio disc, a first track (track 1) is reproduced for a predetermined time and then the reproducing operation is stopped (FIG. 5). At the end of reproducing the track 1, a start address of the next track (track 2) is acquired from the TOC of the audio disc, and the operation of reproducing the next track starts. Subsequently, this sequence of reproducing operations is repeated successively. The track number of the track under reproduction is displayed by the display unit 70. Therefore, the user can visually know the track number of his desired track reproduced, from the display by the display unit 70.

In the sense as mentioned above, the operation panel 80 constitutes special playback instructing means, and the system controller 60 which executes the special playback control program constitutes special playback control means.

As stated already, to select the special playback, i.e., the digest playback or the scan playback, the conventional disc playback device needs two steps; one step to operate the select switch to designate the disc to be reproduced, i.e., the video disc or the audio disc, and a second step to operate the special playback key to designate the special playback to be executed, i.e., the digest playback or the scan playback. Therefore, the operation to select the special playback is complicated and troublesome for the user. On the other hand, the disc playback device of the present invention enables the user to set up the special playback mode in a simple manner. That is, the operations required for the user to select this playback mode are only to load a disc to be reproduced to the device, and to operate the special playback associated with the type of the loaded disc by use of the related key. Thus, the operation for setting up the special playback mode is remarkably improved to be simple and easy.

The operation of the thus constructed disc playback device when it is placed in the special playback mode will be described. To start, the user loads the desired disc to the disc drive unit 20. In response to the disc loading, the system controller 60 of the disc playback device detects the disc loading, reads the TOC of the disc to recognize the type of the loaded disc, and stores the type of the disc into the related storage area. Then, the user operates his desired special playback key on the operation panel 80. The system controller 60 responds to the key operation to execute the special playback control program.

Specifically, the system controller 60 reads out the disc type information from the storage area (step S100), and decides whether or not the loaded disc is the video disc on the basis of the readout information (step S110). If it is the video disc, the controller starts the digest playback operation (step S130).

In the digest playback mode, the reproduced image of the first track is output to the segmental image area (1) (FIG. 4); the reproducing operation is stopped after the reproducing operation continues for a predetermined time; and a still picture at that time is displayed in the segmental image area (1). An audio signal is output in synchronism with the outputting of the image, as a matter of course. Then, the image reproduced from the next or second track is output to the next or second segmental image area (2) while retaining the still picture of the first track in the first segmental image area (1). When the reproducing operation continues for a predetermined time, a still picture at that time is displayed in the same segmental image area. Subsequently, the third track is reproduced, the reproduced image is output to the third segmental image area (3), the reproducing operation of the third track is stopped after it continues for a predetermined time, and the fourth track is reproduced while retaining the still pictures of the third track in the third segmental image area (3), and so on. At the end of reproducing the last track, the digest playback mode is completed.

When the audio disc is set in the disc drive unit 20, viz., the disc playback device is placed in the scan playback mode, the system controller 60 starts the operation of reproducing the first track and causes the display unit 70 to display the track number of the first track. After a predetermined time elapses, the system controller 60 stops the reproducing operation, and reproduces the second track, while at the same time causing the display unit 70 to display the track number of the present track. Subsequently, the sequence of the above operations is repeatedly applied to the subsequent tracks. At the end of reproducing the last track, the scan playback mode is completed.

As described above, in the disc playback device 10 capable of reproducing the video disc and the audio disc which are set in the disc drive unit 20, when a special playback key on the operation panel 80 is operated, the system controller 60 judges the type of the disc to be reproduced. If that disc is the video disc, the disc playback device is operated in the digest playback mode. If the disc is the audio disc, the disc playback device is operated in the scan playback mode. Therefore, the user can select the digest playback or the scan playback without regard to the disc type. The operation of selecting the playback mode is simplified.

What is claimed is:

1. A disc playback device for reproducing either a video disc or an audio disc that is loaded therein, comprising:

digest playback means for reproducing each track of the video disc for a predetermined time in a digest playback mode;

scan playback means for reproducing each track on the audio disc for a predetermined time in a scan playback mode;

a single special playback key for instructing the disc playback device to reproduce each track of the loaded disc for a predetermined time;

disc type judging means for auto-judging the type of disc to be reproduced in response to the instruction from said special playback key; and special playback control means for operating said digest playback means in the digest playback mode if the result of judgment by said disc type judging means shows a video disc, and for operating said scan playback means in the scan playback mode if the result of the judgment by said disc type judging means shows an audio disc.

2. The disc playback device according to claim 1, wherein the digest playback means outputs a reproduced image of each track to its related segmental image area on a divided display screen, and displays a still picture of the reproduced image on the segmental image area after the reproduction of each track.

3. The disc playback device according to claim 2, wherein the scan playback means causes display means to display the track number of the track under reproduction.

4. The disc playback device according to claim 1, further comprising:

a memory for storing the type of disc judged by the disc type judging means.

5. The disc playback device according to claim 1, wherein the disc type judging means judges the type of disc use by a TOC on the disc to be reproduced.

6. A media storing a playback program causing a disc playback device to reproduce each track of a video disc for a predetermined time in a digest playback mode and each track of an audio disc for a predetermined time in a scan playback mode, the playback control program comprising the steps of:

when an instruction to play back each track for a predetermined time is issued from a single special playback key, causing the disc playback device to judge the type of disc to be reproduced;

if the result of judgment shows a video disc, causing said playback device to operate in a digest playback mode; and if the result of judgment shows an audio disc, causing the disc playback device to operate in a scan playback mode.

7. A disc playback device for reproducing either a video disc or an audio disc, comprising:

digest playback means for reproducing each track of the video disc for a predetermined time in a digest playback mode;

scan playback means for reproducing each track of the audio disc for a predetermined time in a scan playback mode;

a single instruction key for establishing either the digest playback mode or the scan playback mode;

disc type judging means for automatically judging a type of disc to be reproduced when either the video disc or the audio disc is loaded in the device without any previous setting;

storage means for storing information indicating the judged type of disc; and special playback control means for selectively operating either the digest playback means or the scan playback means with reference to the information stored in the storage means when the single instruction key is operated.

8. A media storing a playback control program including a plurality of program steps and causing a disc playback device provided with a single instruction key to reproduce each track of a video disc in a predetermined time in a digest playback mode, and each track of an audio disc in a predetermined time in a scan playback mode, wherein said program steps include:

judging automatically a type of disc to be reproduced when either the video disc or the audio disc is loaded in the disc playback device without any previous setting;

storing information indica ting the judged type of disc in storage means; and selectively establishing either the digest playback mode or the scan playback mode with reference to the information in the storage means when the instruction key is operated.

* * * * *